(12) United States Patent
Gregor

(10) Patent No.: US 8,096,407 B1
(45) Date of Patent: Jan. 17, 2012

(54) POLY PHASE DRIVE AND DRIVE CONTROLLER SYSTEM

(75) Inventor: Vaughn Gregor, Sherman Oaks, CA (US)

(73) Assignee: Nicholas Meredith, Baltimore, MD (US)

( * ) Notice: Subject to any disclaimer, the term of this patent is extended or adjusted under 35 U.S.C. 154(b) by 0 days.

(21) Appl. No.: 12/927,165

(22) Filed: Nov. 9, 2010

(51) Int. Cl.
   *B65G 27/32* (2006.01)
(52) U.S. Cl. ........................................ 198/769
(58) Field of Classification Search ............... 198/769
   See application file for complete search history.

(56) References Cited

U.S. PATENT DOCUMENTS

| | | | | |
|---|---|---|---|---|
| 3,366,809 A | * | 1/1968 | Scott | 310/15 |
| 3,400,316 A | * | 9/1968 | Konrad | 318/114 |
| 3,731,787 A | * | 5/1973 | Gregor | 198/358 |
| 3,965,648 A | * | 6/1976 | Tedesco | 53/525 |
| 4,331,263 A | * | 5/1982 | Brown | 222/63 |
| 4,392,897 A | * | 7/1983 | Herrington | 156/66 |
| 4,921,090 A | * | 5/1990 | Gregor | 198/761 |
| 6,357,579 B1 | * | 3/2002 | Patterson et al. | 198/766 |

* cited by examiner

Primary Examiner — Mark A Deuble
(74) Attorney, Agent, or Firm — Thomas I. Rozsa

(57) ABSTRACT

A natural frequency conveyor includes a tray, base, drive system, spring assembly and drive controller for delivery of articles. The drive system includes pairs of identical first and second electromagnets having the respective pole pieces. Preferably the pole pieces of the respective second electromagnets are mounted to the tray, and the pole pieces of the others to the base, so that the second electromagnets so as to the tray are movable in the direction of action of the drive system when energized by a three-phase electricity to be efficient in operation of the conveyor. The spring assembly includes sets of flat springs, which are mounted to the respective tray and base to thereby force the tray to move back when the drive system is not energized. This results in an oscillating movement of the tray according to the natural frequency of the assembly.

15 Claims, 5 Drawing Sheets

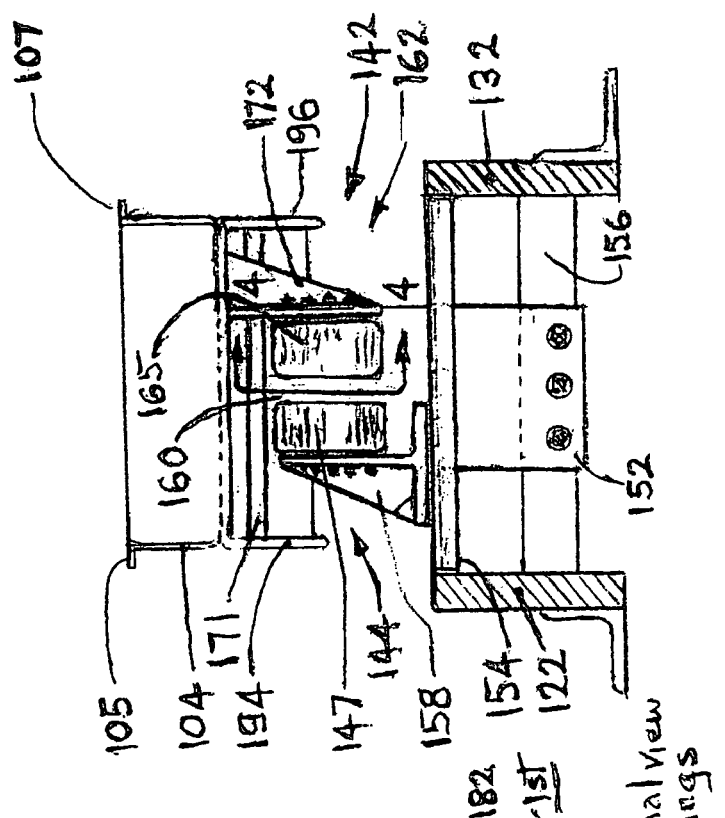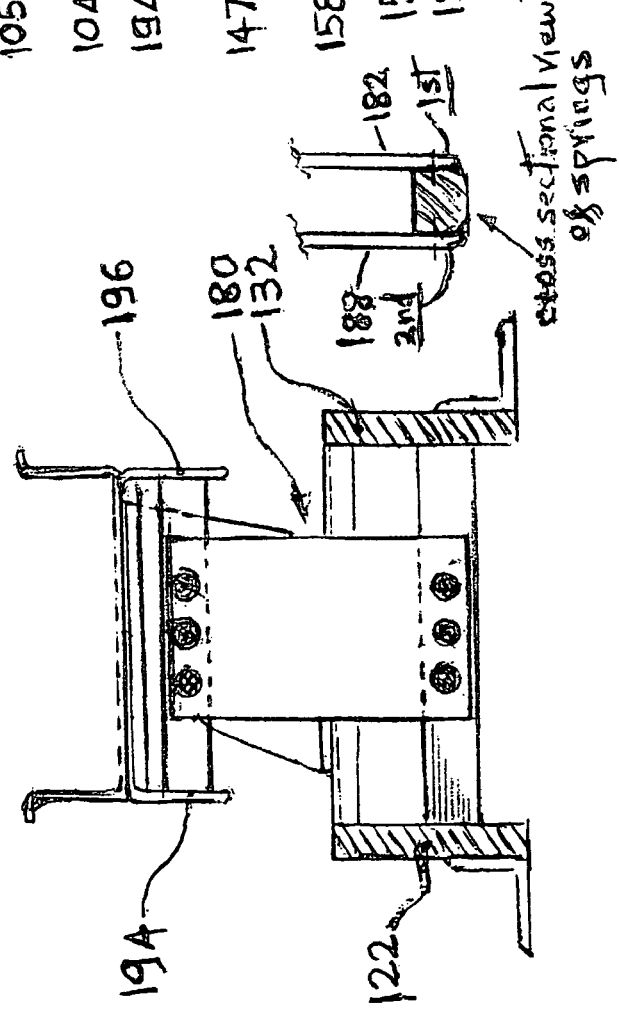

POLY PHASE DRIVE AND DRIVE CONTROLLER SYSTEM

BACKGROUND OF THE INVENTION

1. Field of the Invention

This invention relates to natural frequency conveyors and more particularly, to a poly phase drive and drive controller system for delivering objects such as food from one location to another.

2. Description of the Prior Art

There are a variety of means to power natural frequency conveyors. The most common means to power natural frequency conveyors are:

Electric motor turning an eccentric shaft such as on shaker screens.

Electromagnets creating a pulsing force such as electric shavers.

Most existing natural frequency electromagnetic conveyors are connected to a single phase electric power source which energizes an electromagnet and stator set causing the natural frequency. However, a major setback of the existing conveyors is inefficiency of utilizing electricity when the conveyors are powered by the single phase source of electricity.

Therefore, there is a significant need to provide conveyors which utilize poly phase electric power sources to significantly improve the efficiency in utilizing a source of electricity when the conveyors are in operation.

SUMMARY OF THE INVENTION

The present invention conveyor includes a conveyor tray, a base, a drive system, a spring assembly and a drive controller to thereby have a natural frequency of oscillation of the conveyor tray when in operation and powered by a poly-phase source of electricity to deliver products on the conveyor.

The drive system preferably includes three pairs of identical first and second electromagnets having respective paired pole pieces. The pole pieces within each pair are mounted to face and align with each other, which are in a preferred angle ranging from 15 to 20 degrees relative to an axial direction of the conveyor tray. In addition, the pole pieces of the respective second electromagnets are rigidly mounted to the conveyor tray, and the pole pieces of the respective first electromagnets are mounted to the base of the conveyor.

The spring assembly includes four sets of identical first and second side flat springs, which are simultaneously respectively mounted to the conveyor tray and the base to thereby make the conveyor tray movable along the axial direction of the tray.

The drive controller includes a wave generator, a frequency generator, and a relay assembly having three solid state relays for using a standard power supply having a three-phase source of electricity to thereby enable the present invention conveyor to operate with a reduced energy consumption, which energy consumption is less than half of the existing conveyors using the single-phase source of electricity that causes an imbalance in the power supply.

The wave and frequency generators are specifically for producing a pulse signal including a series of pulse trains that sequentially activate the three solid state relays so that the electromagnets are respectively powered according to the respective phases of the three-phase source of electricity.

Each pair of electromagnets has a first and second electromagnet. When energized by the respective pulses, it causes three second electromagnets of the three pairs of electromagnets to move along the axial direction of the tray so as to move the conveyor tray, wherein the respective pole pieces are offset relative to the pole pieces of the respective first electromagnets, and the flat springs are bent towards a direction of action of the second electromagnets. When not energized, the bent flat springs return to their natural status to thereby move the respective second electromagnets back so that the conveyor tray completes a cycle of oscillating movement. Since the drive controller generates the pulse signal at a controllable frequency and amplitude, an oscillation of the conveyor tray may be readily tuned to select a natural frequency of the conveyor.

In addition, due to the pole pieces of the respective paired electromagnets that are affixed to the conveyor tray at an angle of 15 to 20 degrees, this causes articles in the tray to be projected forward parallel to the axis of oscillation of the tray with each cycle of the drive system. As this cycle is repeated, the articles are progressively moved from an input end to a delivery end of the conveyor tray.

It is therefore an object of the present invention to create a conveyor including a conveyor tray, a base, a drive system, a spring assembly and a drive controller to thereby have a natural frequency of oscillation of the conveyor tray when in operation under a poly-phase source of electricity to deliver articles.

It is also an object of the present invention conveyor to have a drive system that preferably includes three pairs of identical first and second electromagnets having respective paired pole pieces. The pole pieces within a pair are mounted to face and be aligned with each other, which alignment is in a preferred angle ranging from 15 to 20 degrees relative to an axial direction of the conveyor tray. In addition, the pole pieces of the respective second electromagnets are rigidly mounted to the conveyor tray, and the pole pieces of the respective first electromagnets are mounted to the base of the conveyor.

It is an additional object of the present invention conveyor to incorporate a spring assembly including four sets of identical first and second side flat springs, which are simultaneously mounted to the respective conveyor tray and base to thereby make the conveyor tray movable along the axial direction of the tray.

It is a further object of the present invention conveyor to provide the drive controller including a wave generator, a frequency generator, and a relay assembly having three solid state relays for using a standard power supply having a three-phase source of electricity to thereby make the present invention conveyor have a reduced energy consumption which is less than half the energy consumption of existing conveyors using a single-phase source of electricity that causes imbalance in the power supply.

It is still a further object of the present invention conveyor to provide wave and frequency generators that are specifically for producing a pulse signal including a series of pulse trains that sequentially activate the three solid state relays so that the electromagnets are respectively powered according to the respective phases of the three-phase source of electricity.

It is still a further additional object of the present invention conveyor to have a mechanism of operation as follows: when energized by the respective pulses, it causes the three second electromagnets of the paired electromagnets to move along the axial direction of the tray so as to move the conveyor tray, wherein the respective pole pieces are offset relative to the pole pieces of the respective first electromagnets, and the flat springs are bent towards a direction of action of the second electromagnets. When not energized, the bent flat springs return to their natural state to thereby move the respective second electromagnets back as the conveyor tray completes a cycle of oscillating movement. The drive controller generates the pulse signal at a controllable frequency and amplitude so that an oscillation of the conveyor tray may be readily tuned to select a natural frequency of 50 or 60 cycles per second to match the frequency of the power supply.

It is still additional object of the present invention conveyor to provide the pole pieces of the respective paired electromagnets that are affixed to the conveyor tray at the angle of 15 to 20 degrees, which causes articles in the tray to be projected forward parallel to the axis of oscillation of the tray with each cycle of the drive system. As this cycle is repeated, the articles are progressively moved from an input end to a delivery end of the conveyor tray.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 3A is a cross sectional view of the conveyor taken along line 3A-3A of FIG. 2;

FIG. 3B is a cross sectional view of the conveyor taken along line 3B-3B of FIG. 2;

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
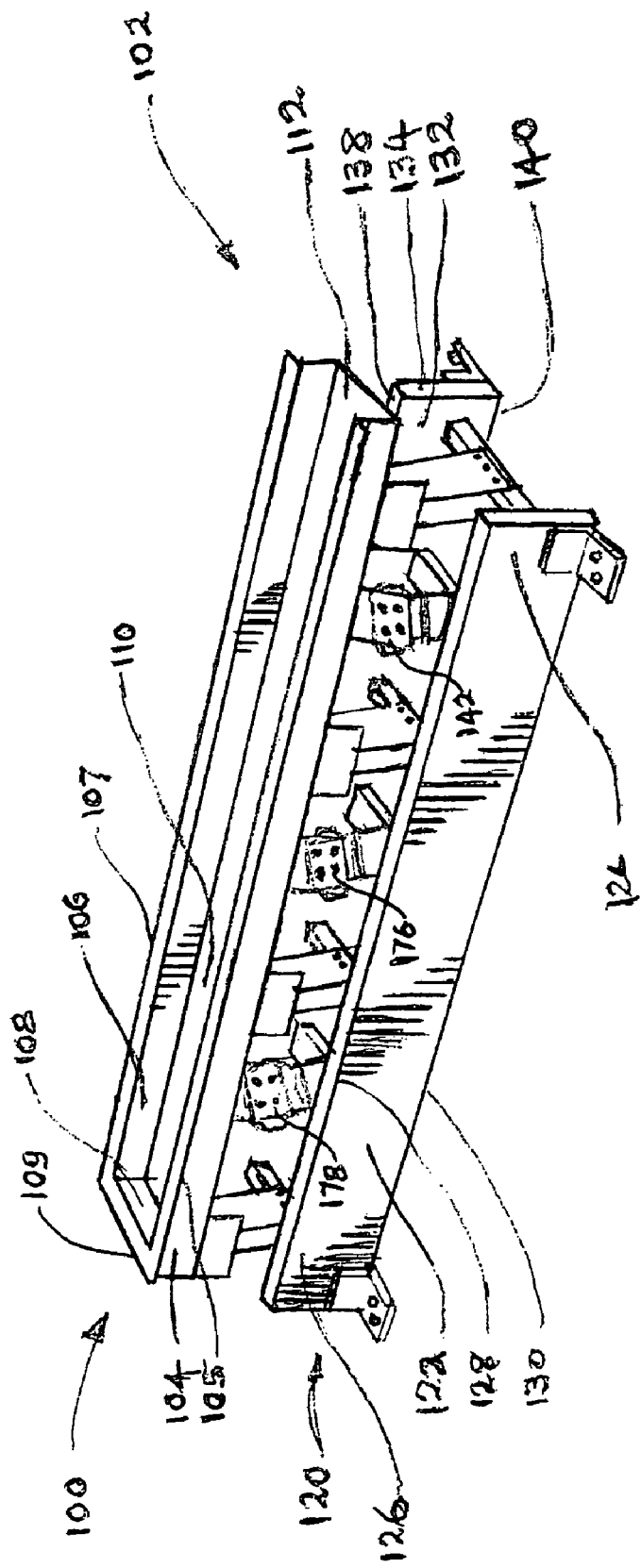
FIG. 1 is a perspective view of a natural frequency conveyor used to test and demonstrate the present invention.
Figure 2:
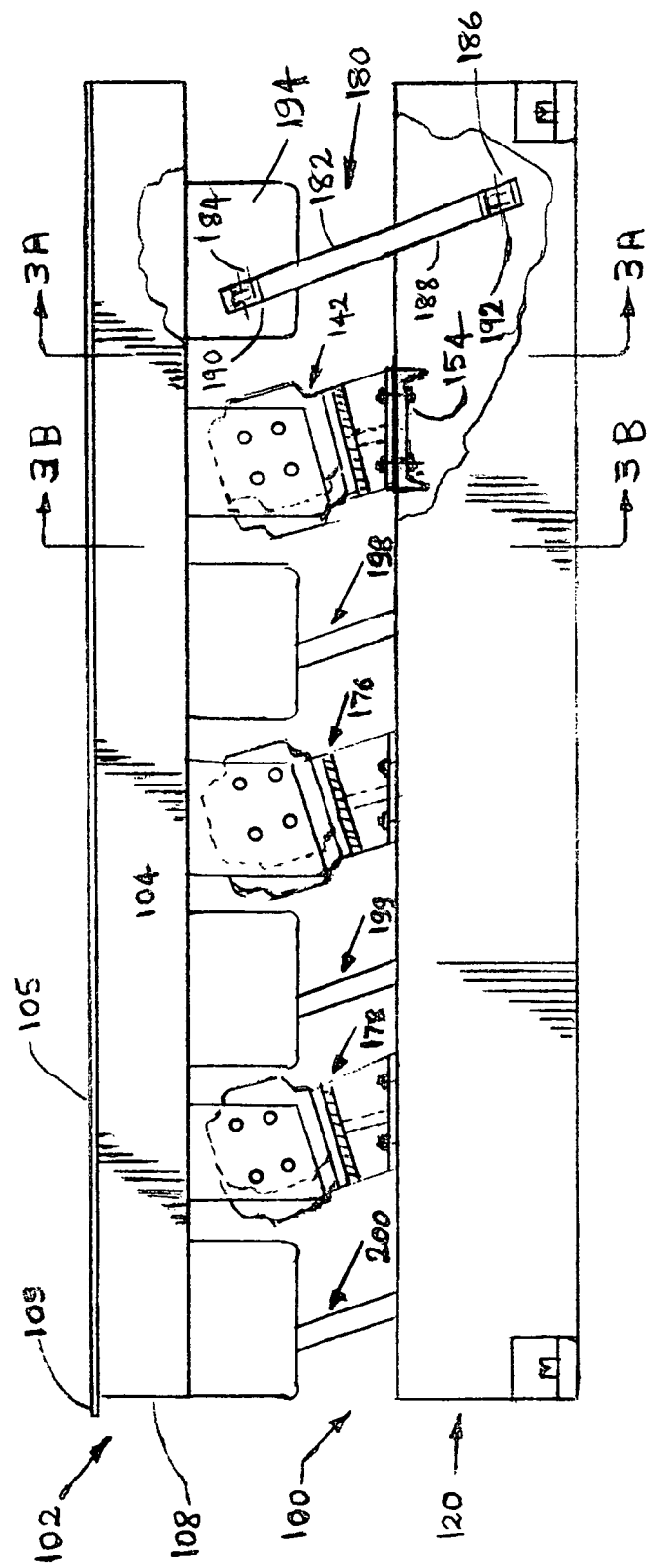
FIG. 2 is a front side view of the conveyor illustrated in FIG. 1.

The present invention is embodied in a natural frequency conveyor 100 as shown in FIG. 1 and FIG. 2. The conveyor employs a poly-phase source of electricity to thereby obtain superior efficiency in utilizing electricity over the existing conveyors powered by a single phase source of electricity.

The conveyor 100 is comprised of a conveyor tray 102, a base 120, a drive system including identical first, second and third drives 142, 176 and 178, and a spring assembly including identical first, second, third and fourth sets 180, 198, 199 and 200 of flat springs, wherein each drive and spring set are alternatively positioned to be spaced apart for simultaneously connecting to the tray and base to thereby support the tray that is oscillating when the conveyor is in operation.

In a preferred embodiment the conveyor tray 102 has the shape of an elongated trough with an opened top on one end, including a first (or front) longitudinal side 104 having a top lip 105, a second (or rear) longitudinal side 106 having a top lip 107, a distal transverse side 108 serving as a tray distal end that also has a top lip 109, an opened proximal end 112, and a bottom side 110. The conveyor tray is used for conveying articles. It will be appreciated that it is within the spirit and scope of the present invention to have other shapes and structures that are also appropriate for the tray. Therefore, the tray can be broadly defined as a tray means.

The base 120 is preferably a beam supported structure, including a first or front longitudinal member 122 that has a proximal end 124, distal end 126, top side 128 and bottom side 130, a second or rear longitudinal member 132 that has a proximal end 134, distal end (not shown), top side 138 and bottom side 140, and a plurality of identical upper transverse beams 154 and lower transverse beams 156. The upper transverse beams 154 are evenly spaced apart to perpendicularly affix to the first and second longitudinal member 122 and 132, wherein a top side of the beam 154 is aligned with the top sides 128 and 138 of the respective longitudinal members. In a preferred embodiment, the upper beam is an elongated channel which provides improved mechanical strength for the base.

The lower transverse beams 156 are evenly spaced apart and are perpendicularly affixed to the first and second longitudinal member 122 and 132 at positions adjacent the bottom sides 130 and 140 of the respective longitudinal members. As further illustrated, each identical upper beam is not vertically aligned with each identical lower beam. Although the base is disclosed according to the above illustrated structure, the base can be broadly defined as a base means.

Figure 5:
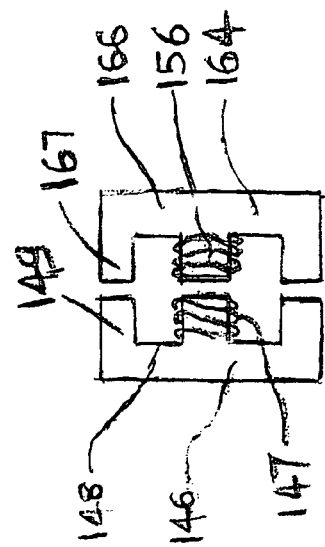
FIG. 5 is a schematic diagram, which illustrates configuration of one pair of the electromagnets.
Figure 4:
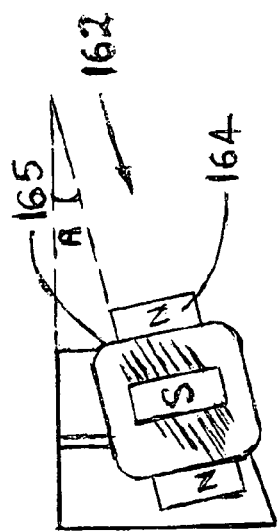
FIG. 4 is a transverse side view of an electro magnet, which is taken along line 4-4 of FIG. 3.

Referring to FIG. 3A, there is illustrated affixation of each identical drive 142 to the conveyor. In a preferred embodiment, the drive is a set of identical first and second electromagnets 144 and 162. As illustrated in FIG. 4 and FIG. 5, the first (or front) electromagnet 144 includes a first pole piece 146 having front (or exterior) and rear (or interior) sides 148 and 149 that contain a first winding coil 147, wherein the first winding coil 147 is positioned to surround a central member of the pole piece and not exceed the interior side 149. The second (or rear) electromagnet 162 includes a second pole piece 164 having front (or interior) and rear (or exterior) sides 167 and 166 that contain a second winding coil 156, wherein the second winding coil is positioned to surround a central member of the pole piece and not exceed the interior side 167.

In affixation of the first drive 142 of the paired electromagnets, as particularly illustrated in FIG. 5, the first and second electromagnets 144 and 162 are positioned by the respective supporting members wherein the first pole piece 146 is aligned with the second pole piece 164. In this setting, the rear (or interior) side 149 of the first pole piece faces the front (or interior) side 167 of the second pole piece to thereby maintain an air gap 160 between the first and second electromagnets 144 and 162.

Referring to FIG. 2 and FIG. 3A, there is illustrated first support 150 which is used to affix the first electromagnet 144, and a second support 168 which is used to affix the second electromagnet 164 to the conveyor. Preferably, the first support 150 is an inverted "T" shaped structure having an upper narrow upward portion connected to a lower transverse portion 152. As illustrated, the upper upward portion is inwardly affixed to the front side 148 of the first pole piece 146, and the bottom side 152 of the first support 150 is affixed to a top of the upper transverse beam 156. In addition, an additional structure 151 serving as a reinforcing affixation member is simultaneously affixed inwardly to the upward portion of the first support 150, and downwardly to the upper transverse beam 154 of the base. In a preferred embodiment, the additional structure 151 is triangular in shape, and is positioned angularly to align with an orientation of the first support 150.

The second support 168 has a preferable shape of a strip including a top end 170 which is inwardly (or frontwardly) affixed to the exterior side 166 of the second pole piece 164 of the second electromagnet, wherein the top end 170 of the second support is affixed to the bottom side of a transverse member 171. Referring to FIG. 2 and FIG. 3A, the transverse member 171 is affixed to the respective first and second downward extensions 173 and 174 which are upwardly aligned to connect to the respective first and second longitudinal sides 104 and 106 of the conveyor tray. As further illustrated, an additional structure 172 serving as a reinforcing affixation member is simultaneously affixed inwardly (or frontwardly) to the second support 168, and upwardly to the bottom side 110 of the tray. In a preferred embodiment, the additional structure 172 is triangular in shape and is positioned angularly to align with an orientation of the second support 168.

It will be appreciated that the above disclosed embodiment of the structure which is used to affix the first and second electromagnets as one embodiment and other structures are also within the spirit and scope of the present invention.

As specifically illustrated in FIG. 4, the first and second electromagnets 144 and 162 are additionally positioned, wherein an orientation of the exterior sides 148 and 166 of the respective pole pieces have an angle "A" ranging from 15 to 20 degrees relative to an axial orientation of the conveyor tray.

It will be appreciated that the identical second and third drivers 176 and 178 are affixed to the conveyor in the same way as the supporting members, as discussed above for affixing the first driver 142.

Referring to FIGS. 1, 2 and 3B, there is illustrated affixation of a first set 180 of the flat springs to the base and conveyor tray. This includes a first (or proximal) side flat spring 182 having a top end 184 and a bottom end 186, and a second (or distal) side flat spring 188 having a top end 190 and a bottom end 192, wherein the first and second side flat springs are identical and rectangular in shape and have an appropriate thickness. For affixing the first set of flat springs, there is used third (or front) downward extension 194 and fourth (or rear) downward extension 196 that are upwardly aligned to connect to the respective first and second longitudinal sides 104 and 106 of the conveyor tray. In addition, an additional transverse member 195 is perpendicularly connected to the respective front and rear extensions 194 and 196. In this setting, the first side flat spring 182 is affixed, wherein its top end 184 is affixed to a proximal side of the transverse member 195 and its bottom end 186 is affixed to a proximal side of a lower transverse beam 156. Similarly, the second side flat spring 188 is affixed, wherein its top end 190 is affixed to a distal side of the transverse member 195 and its bottom end 192 is affixed to a distal side of the lower transverse beam 156.

It will be appreciated that the identical second, third and fourth sets 198, 199 and 200 of the flat springs are affixed to the conveyor in the same way discussed above for affixing the first set 180 of the flat springs.

From the above disclosure, it will be appreciated that the conveyor tray 102 is now vibrationally to attached to the base 120 of the conveyor, wherein its vibrational movement is aligned with an axial orientation of the conveyor due to properties of the rectangular shaped flat springs that are perpendicularly positioned relative to the axial orientation of the conveyor.

Figure 6:
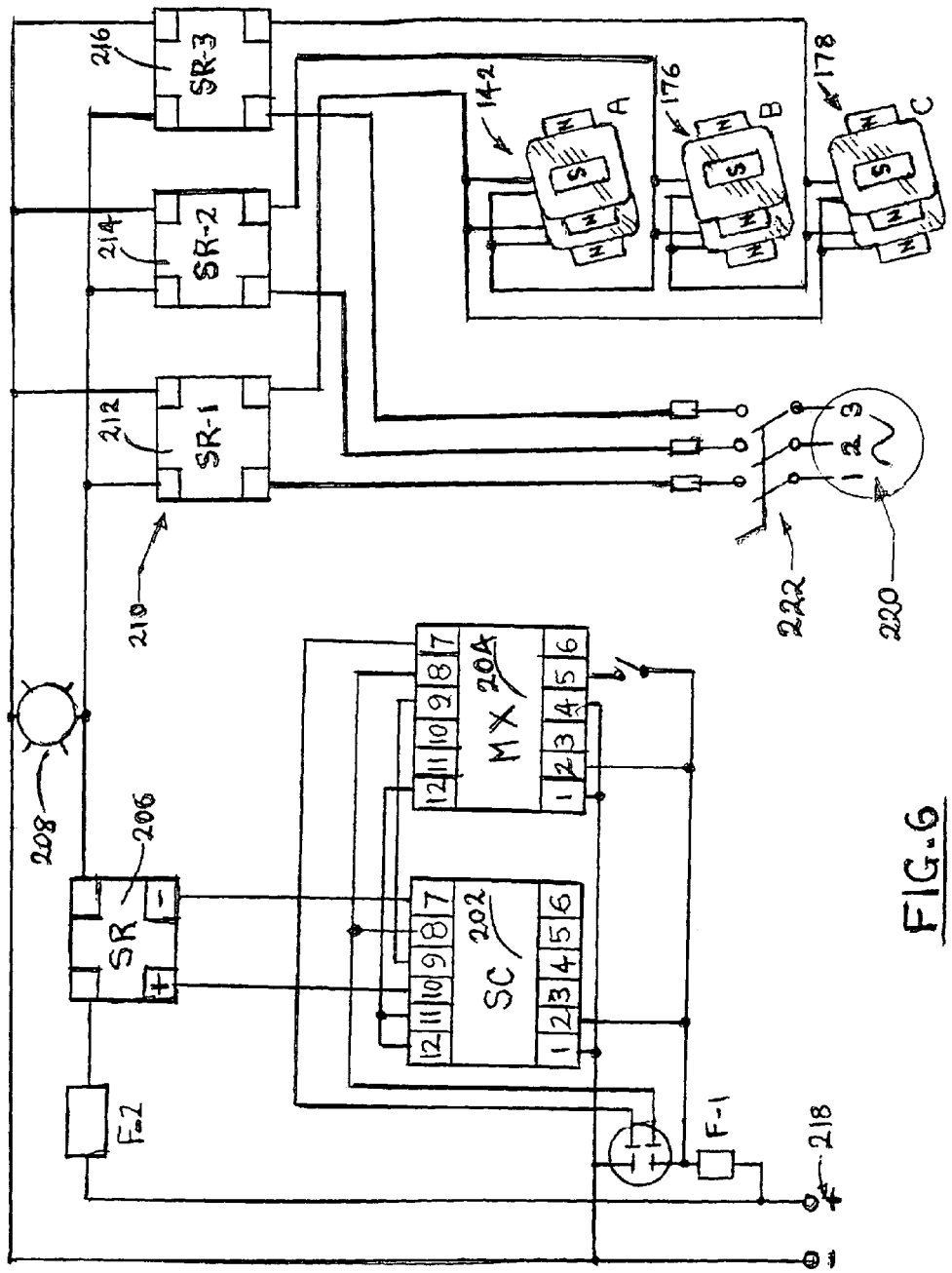
FIG. 6 is an electrical wiring diagram to show electrical connection of components of the present invention conveyor to power supplies.

Referring to FIG. 6, there is illustrated the drive controller of the present invention conveyor. The controller includes a switch 222 for connecting a three-phase electricity supply 220, a relay assembly 210 containing three solid state relays 212, 214 and 216 that through the switch are connected to the electricity supply using one for each phase and additionally one of the three drives 142, 176 and 178, a wave generator (SC) 202, a frequency generator (MX) 204, a SR 206, and a light 208, wherein a 120-volt electricity supply 218 is for powering the wave generator, frequency generator, relay assembly and light, It will be appreciated that the wave generator and frequency generator are for producing a pulse signal including a series of pulse trains to the three solid state relays to thereby operate the relays. The three relays in operation then make the coils of the respective three drivers pulsed by the respective phases of the three-phase source electricity. Within the controller, the frequency generator 204 delivers a signal to the wave generator 202 to control the opening and closing of the relays. The signal is an on-off type, which closes each of the relays for a controllable period of time, thereafter opening the relay, and then again closes the relay after ending the controllable period of time. This sequence of the control signal is then repeated.

The following uses the first drive as an example to illustrate how to generate an oscillating movement of the conveyor tray. When energized by one of the three-phase source of electricity, it operates the first drive 142 of the electromagnets. A repulsive force generated between the first and second electromagnets 144 and 162 causes the second electromagnet 162 to move along a direction that is from the distal end to the proximal end of the conveyor tray, since the first electromagnet 144 is rigidly affixed to the base that is unmovable. This enables the conveyor tray 102 to move in the same direction because the tray is rigidly affixed to the second electromagnet. In addition, the repulsive force also causes the flat springs, including the first set of the first and second side flat springs 182 and 188, to bend towards the same direction to thereby energize the springs.

When the circuit is off, the second electromagnet 162 is moved back due to forces of the bent flat springs 182 and 188 that intend to keep their natural status of aligning vertically. This results in the conveyor also moving back along a direction that is towards the distal end of the tray. Therefore, the tray finishes a cycle of an oscillating movement before a next pulse of energy is applied to the first driver. Since the electricity of the alternating current supplied to the drive is generally available at a frequency of 50 or 60 cycles per second, the conveyor tray is thereby oscillated according to the frequency that is a natural frequency of the conveyor assembly.

It will be appreciated that all three drives are simultaneously energized by the triple phased electricity and four sets of the flat springs to thereby cause the corresponding oscillating movement of the conveyor tray.

As illustrated previously, each of the three drives are positioned to have the inclined angle of 15 to 20 degrees. Therefore, this causes articles in the conveyor tray 102 to be projected forward parallel to the axis of oscillation with each cycle of the drives. As this cycle is repeated, the articles are progressively moved from an input end that is the distal end 114 to a delivery end that is the proximal end 112 of the conveyor tray.

It will be further appreciated that the use of a standard power supply having a three-phase source of electricity makes the present invention conveyor run with less energy consumption, which is less than half of the energy consumption of existing conveyors using the single-phase source of electricity that causes an imbalance of the power supply.

It will be appreciated that the above multiple paired identical first and second electromagnets of the drive system is a first preferred embodiment, wherein the respective first and second pole pieces are positioned to face each other to thereby be aligned with each other. However, in a preferred second embodiment, the respective first and second pole pieces are positioned at the same height but offset from each other. In this setting, when the first and second electromagnets of a drive system are energized, an attractive force between the first and second electromagnets will move the conveyor tray, as compared with the repulsive force in the first embodiment. Therefore, the conveyor is also operable according to the second embodiment of the drive system, in addition to a structure for affixing the respective paired electromagnets. It will be appreciated that such structure is obvious to those of ordinary skill in art.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A natural frequency conveyor for conveying articles comprising:
   a. a conveyor tray including a first longitudinal side having a top lip, a second longitudinal side having a top lip, a distal transverse side having a top lip, an opened proximal end and a bottom side;
   b. a base including a first longitudinal member having top and bottom sides, a second longitudinal member having top and bottom sides, a plurality of upper and lower transverse beams, the upper transverse beams are evenly spaced apart to be perpendicularly affixed to the top sides of the respective first and second longitudinal members, the lower transverse beams are evenly spaced apart to be perpendicularly affixed to the respective first and second longitudinal members at positions adjacent the bottom sides, wherein each upper beam is positioned between two adjacent lower beams;
   c. a drive system including three pairs of identical first electromagnets having respective first pole pieces and second electromagnets having respective second pole pieces, wherein a first pole piece and a second pole piece within a pair are mounted facing each other to thereby have an air gap, the first pole piece is rigidly mounted to the base, and the second pole piece is rigidly mounted to the bottom side of the conveyor tray;
   d. a spring assembly including four sets of identical proximal side flat springs and distal side springs that are rectangular in shape and have respective top ends and bottom ends, wherein within a set the proximal and distal side springs at respective top ends are affixed to the conveyor tray and at the bottom end are affixed to the base;
   e. a drive controller including a relay assembly containing three solid state relays, a wave generator, a frequency generator and a switch for connecting a three-phase electricity supply; and
   f. the drive controller produces a pulse signal in a series of pulse trains to operate the three solid state relays so that the three paired first and second electromagnets are sequentially energized, which results in an oscillating movement of the conveyor tray in addition to the effect provided by the spring assembly.

2. The conveyor in accordance with claim 1, wherein the first pole piece and second pole piece within the pair are mounted to have an angle ranging from 15 to 20 degrees relative to an axial direction of the conveyor tray.

3. The conveyor in accordance with claim 1, wherein the pulse signal includes three-phase trains of the respective pulses.

4. The conveyor in accordance with claim 3, wherein the pulses include alternating current.

5. The conveyor in accordance with claim 1, wherein the first pole piece and second pole piece within a pair are mounted to be offset from each other to thereby have an air gap.

6. A natural frequency conveyor for conveying articles comprising:
   a. a conveyor tray;
   b. a base;
   c. a drive system including a plurality of pairs of identical first electromagnets and second electromagnets;
   d. a spring assembly including a plurality of sets of identical proximal side flat springs and distal side springs;
   e. a drive controller;
   f. the conveyor tray including a first longitudinal side having a top lip, a second longitudinal side having a top lip, a distal transverse side having a top lip, an opened proximal end and a bottom side;
   g. the base including a first longitudinal member having top and bottom sides, a second longitudinal member having top and bottom sides, a plurality of upper and lower transverse beams, the upper transverse beams are evenly spaced apart and are perpendicularly affixed to the top sides of the respective first and second longitudinal members, the lower transverse beams are evenly spaced apart to perpendicularly affix to the respective first and second longitudinal members at positions adjacent the bottom sides, wherein each upper beam is positioned between two adjacent lower beams;
   h. the first electromagnets having the respective first pole pieces and second electromagnets having the respective second pole pieces, wherein a first pole piece and a second pole piece within a pair are mounted facing each other to thereby have an air gap, the first pole piece is rigidly mounted to the base, and the second pole piece is rigidly mounted to the bottom side of the conveyor tray;
   i. the spring assembly including four sets of identical proximal side flat springs and distal side springs that are rectangular in shape and have respective top ends and bottom ends, wherein within a set the proximal and distal side springs at the respective top ends are affixed to the conveyor tray and at the bottom end are affixed to the base; and
   j. the drive controller including a relay assembly containing three solid state relays, a wave generator, a frequency generator and a switch for connecting a three-phase electricity supply.

7. The conveyor in accordance with claim 6, wherein the drive controller produces a power signal in a series of pulse train to operate the three solid state relays so that the plurality of pairs of electromagnets are simultaneously energized, which results in an oscillating movement of the conveyor tray in addition to the effect provided by the spring assembly.

8. The conveyor in accordance with claim 6, wherein the first pole piece and second pole piece within the pair are mounted to have an angle ranging from 15 to 20 degrees relative to an axial direction of the conveyor tray.

9. The conveyor in accordance with claim 6, wherein the pulse signal including three-phase trains of the respective pulses.

10. The conveyor in accordance with claim 9, wherein the pulses includes alternating current.

11. The conveyor in accordance with claim 6, wherein the first pole piece and second pole piece within a pair are mounted to be offset from each other to thereby have an air gap.

12. A natural frequency conveyor for conveying articles comprising:
   a. resilient tray support means for supporting said tray means from said frame means at a natural position, said resilient tray support means being flexible and producing a restoring force when said tray is displaced from the neutral position;
   b. drive means for forcing said tray means from the neutral position in a direction of oscillation, said drive wherein the drive comprises three pairs of pole pieces offset along a direction of action of the drive, and movable in the direction of action of the drive when energized by a power signal;
   c. preferably, one of the pole pieces of each pair is mounted to a tray portion, and the other pole piece is mounted to the frame of the conveyor, said first and second pole piece include having first and second faces, respectively, said first and second faces being positioned adjacent each other at a fixed separation measured transverse to the direction of action but being displaced from each other when said tray support means is in the neutral position by an amount of about the width of either pole piece face, said displacement being in the direction of motion; and
   d. drive controller means for supplying a power signal to said drive means, said power signal comprising three separate repetitive train of pulses, the frequency and duration of said pulses being controllable by said drive controller means, whereby the three pairs of pole pieces may be energized to oscillate the tray at a controllable frequency and amplitude so that the oscillating tray may be readily tuned to optimal performance.

13. The natural frequency conveyor of claim 12, wherein each of the three pairs of pole pieces has a coil wound thereon, and each pair of coils are simultaneously energized so as to produce opposite polarities, one set connected to each phase of the poly phase power supply.

14. The natural frequency conveyor of claim 12, wherein each pulse of the three-phase train of pulses comprises alternating current.

15. A natural frequency conveyor for conveying articles comprising:
   a. frame means;
   b. tray means for receiving the product;
   c. resilient tray support means for supporting said tray means from said frame means at a natural position, said resilient tray support means being flexible and producing a restoring force when said tray is displaced from the neutral position;
   d. drive means for forcing said tray means from the neutral position in, a direction of oscillation, said drive wherein the drive comprises three pairs of pole pieces offset along a direction of action of the drive, and movable in the direction of action of the drive when energized by a power signal; and
   e. drive controller means for supplying a power signal to said drive means, said power signal comprising three separate repetitive train of pulses, the frequency and duration of said pulses being controllable by said drive controller means, whereby the three pairs of pole pieces may be energized to oscillate the tray at a controllable frequency and amplitude so that the oscillating tray may be readily tuned to optimal natural frequency performance.

* * * * *